Sept. 22, 1970  E. L. B. KROEKER  3,529,703
CLOSED LOOP SPRING CLUTCH
Filed June 14, 1968

INVENTOR
ELMER LEROY BOB KROEKER

BY *John W. Girvin, Jr.*

ATTORNEY

United States Patent Office 3,529,703
Patented Sept. 22, 1970

3,529,703
CLOSED LOOP SPRING CLUTCH
Elmer Leroy Bob Kroeker, Austin, Tex., assignor to International Business Machines Corporation, Armonk, N.Y., a corporation of New York
Filed June 14, 1968, Ser. No. 737,133
Int. Cl. F16d *41/34*
U.S. Cl. 192—26                                                7 Claims

ABSTRACT OF THE DISCLOSURE

A closed loop spring clutch mechanism having a first spring winding arranged for intermittent drive of a rotary load from a continuously rotating drive shaft and having a second spring winding located on the drive shaft which is operative on the free end of the first spring winding when the first spring winding slips with respect to the rotating shaft and load. The second spring winding forces the first spring winding to wrap down tighter thereby stabilizing the wrap down or engagement time of the clutch.

BRIEF BACKGROUND OF INVENTION

Field

The invention relates to a clutch mechanism utilizing a spirally wound clutch spring for coupling two rotatably mounted parts together and, more particularly, to an improvement in such a clutch mechanism wherein a compensating force is applied to the free end of the clutch spring when the clutch spring slips with respect to the rotatably mounted parts.

Description of the prior art

Spring or coil clutch mechanisms have long been used to intermittently connect a continuously rotating drive shaft, drum or arbor to an output shaft, drum or arbor. Such clutch mechanisms may be rapidly engaged and disengaged to thereby provide a high degree of control over the intermittent motion of the output drum. However, since the input shaft is continuously rotating with respect to the coil spring except when the clutch is engaged and further, since the inherent operation of the clutch relies on the frictional engagement of the spring with the input shaft, both the input shaft and the inner surface of the spring tend to wear over a period of time. The time that it takes for the clutch to engage increases as a function of such wear. A portion of this increase in engagement time can attributed to the increased length of the helix which is defined by the inner surface of the spring. An additional increase in engagement time can be attributed to slippage between the inner surface of the helical spring and the input shaft. This slippage is also caused by wear and is intermittent in its nature since it will sometimes occur and sometimes not occur on an unpredictable basis. In the past, when such wear problems were encountered, it was common practice to change the frictional characteristics of the spring and the input shaft by adding various types of lubricants to the shaft. This often reduced the frequency of occurrence of slippage but did not effect a permanent solution. Thus, it was often necessary to replace the worn clutch with a new one having a predictable engagement time.

SUMMARY

In order to overcome the above problems and short comings of the prior art and to provide the spring clutch mechanism which is reliable over a much longer period of operation time than the prior art spring clutches, the spring clutch mechanism of the present invention is provided with an additional spring coil which is located on the drive shaft and which is operative on the free end of the helical clutch spring to stabilize the wrap down time of the helical clutch spring. Since both the additional spring and the helical cutch spring rotate with the same peripheral velocity when the clutch is engaged, the additional spring coil has no effect on the helical clutch spring when the helical clutch spring causes the engagement of the input shaft and the output shaft. However, when the slippage between the input shaft and the clutch spring occurs and the clutch spring no longer moves with the input shaft, the additional spring which moves with the input shall engages the free end of the helical clutch spring forcing it to wrap down tightly about the input shaft. Thus, the additional spring coil is operative only when slippage occurs and, thus corrects the slippage while the clutch is in cycle before the slippage causes an appreciable delay in the wrap down or engagement time of the clutch.

An additional feature of the present invention is its inherent ability to stabilize the wrap down time of the clutch provided that the speed of the input shaft is great relative to the normal wrap down time of the helical spring coil.

The foregoing and other features and advantages of the invention will be apparent from the following more particular description of the preferred embodiment of the invention as illustrated in the accompanying drawings.

Figure 1:
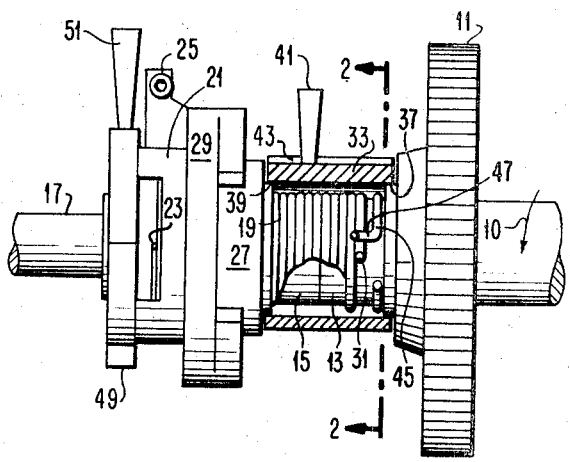
FIG. 1 is an elevational view, partially in section, of the spring clutch mechanism of the present invention.

Referring now to FIG. 1, the spring clutch mechanism of the present invention is depicted. This mechanism is operative to transmit rotary motion in the direction of arrow from drive pully 11 through the primary arbor 13 to the secondary arbor 15. The primary arbor 13 is rotatably mounted with respect to the output shaft 17 and the secondary arbor 15 is fixedly mounted to the output shaft 17. The helically wound clutch spring 19 is wrapped about the primary arbor 13 and the secondary arbor 15. The anchor clamp 21 is operative to clamp the end 23 of the clutch spring against the secondary arbor 15. An adjustment screw 25 is operative to adjustably tighten down the anchor clamp 21 and thereafter hold the anchor clamp in its adjusted position. The anchor clamp 21 is mounted over the collar 27 which has a restoring cam 29 integrally formed therewith.

Figure 2:
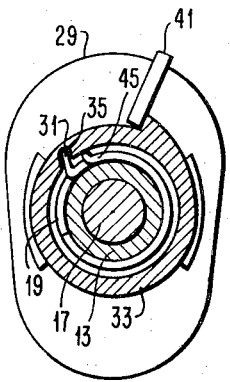
FIG. 2 is a sectional view of the mechanism through line 2—2 of FIG. 1

The free end 31 of the clutch spring 19 fits into an opening formed in the clutch sleeve 33. Reference is made to FIG. 2 which shows the opening 35 in the clutch sleeve 33. Referring once again to FIG. 1, the clutch sleeve 33 is supported by a flange 37 on the drive pulley 11 and by a flange 39 on the collar 27 and is adapted to rotate relative to the flanges. Stop member 41 engages a cam surface 43 on the clutch sleeve 33 preventing the clutch sleeve from rotating. When the stop member is thus engaged, the clutch sleeve 33 through its opening acts on the free end 31 of the clutch spring 19 to thereby prevent it from engaging the primary arbor 13. When the stop member 41 is disengaged from the cam surface 43, the clutch sleeve 33 is free to rotate thereby removing the inhibiting force from the free end of the spring 31. With the inhibiting force removed, the free end of the spring 31 wraps down on the primary arbor 13 and simultaneously causes the clutch sleeve 33 to move with it. When a sufficient number of coils of the clutch spring have engaged the primary arbor 13 during the wrap down, motion is transmitted from the primary arbor 13 to the secondary arbor 15 and the clutch spring 19 and the clutch sleeve 33 rotate with the primary and secondary arbors.

Since the engagement of the clutch spring 19 with the primary arbor 13 is a frictional engagement, and since the load attached to output shaft 17 may be relatively large, it is possible that the spring may first engage the primary arbor 13 and then lose traction or frictional contact with it. When this occurs, the primary arbor rotates relative to the spring which is then inoperative to transfer the rotary motion of the primary arbor to the secondary arbor. In order to minimize the slippage, a backup spring 45 is elastically preloaded onto the primary arbor 13 and has an end 47 which is bent to engage the free end 31 of the clutch spring 19. The backup spring is operative during cycle only when slippage occurs between the clutch spring 19 and the primary arbor 13. When such slippage occurs, the primary arbor 13 moves relative to the clutch spring 19. Since the backup spring is frictionally engaged with the primary arbor, it is rotated thereby against the free end 31 of the clutch spring thereby causing the clutch spring 19 to wrap down tighter about the primary arbor 13. When the clutch spring and primary arbor are engaged, the clutch spring rotates with the primary arbor as does the backup spring and hence the backup spring has no effect.

When it is desirous to declutch, stop member 41 engages cam surface 43 thereby causing clutch spring 19 to unwrap from the primary arbor 13. When the stop member 41 is thus engaged, the backup spring comes to a rest position against the free end of the clutch spring 31. Since the primary arbor is continuously rotating in the direction of arrow 10, the force applied to the end 45 of the backup spring by the free end 31 of the clutch spring tends to unwind the backup spring. This force is counterbalanced by the frictional force between the primary arbor and the backup spring. The backup spring mechanism thus is inherently a self-compensating one which self-compensates for wear to the spring and for frictional changes.

An antibacklash cam 49 is mounted to the secondary arbor 15 and cooperates with pawl 51 to prevent rotation of the output shaft 17 in a direction opposite to the driving direction of arrow 10.

OPERATION

In operation, whenever it is desirous to transmit the rotary motion of the continuously rotating primary arbor 13 which is rotating in the direction of arrow 10 to the secondary arbor 15 and hence to the load shaft 17, the stop member 41 is released from the cam surface 43 of the clutch sleeve 33. This action removes the inhibiting force on the free end 31 of the clutch spring 19 previously provided by the opening 35 (see FIG. 2) of the clutch sleeve 33, thereby allowing the clutch spring 19 to wrap down on the primary arbor 13. As the clutch spring thus wraps down, it frictionally engages the primary arbor. Since the opposite end 23 of the clutch spring is clamped to the secondary arbor, the rotary motion of the primary arbor 13 is transmitted to the secondary arbor 15 and hence to the output shaft 17.

When the clutch spring 19 frictionally engages the primary arbor 13, it is driven by the primary arbor 13 and rotates with it. If, however, slippage occurs between the clutch spring 19 and the primary arbor 13, the primary arbor 13 rotates with respect to the clutch spring 19. As the primary arbor thus rotates with respect to the clutch spring, backup spring 45, which is frictionally engaged with the primary arbor, is carried thereby into engagement with the free end 31 of the clutch spring. The end 47 of the backup spring produces a force against the free end 31 of the clutch spring 19 which wraps the clutch spring down about the primary arbor 13. This wraps down force thus provides an additional normal force between the surface of the primary arbor and the inner surface of the clutch spring 19, thereby increasing traction and preventing further slippage. Thereafter, both the clutch spring 19 and the backup spring 45 rotate at the speed determined by the speed of the primary arbor until further slippage occurs. If such further slippage occurs, the backup spring is again operative in a similar manner to that described above to increase the normal force on the clutch spring 19.

The backup spring 45 is preloaded onto the primary arbor 13 so that it provides a sufficient force to aid the wrap down of the clutch spring 19. Since the backup spring is inherently self-compensating for frictional wear, the force which it applies to the clutch spring 19 is relatively constant over the life of the device.

In those clutch devices where the speed of the input shaft or primary arbor is relatively great with respect to the time that it takes for the clutch spring 19 to wrap down, the backup spring 45 can be utilized to stabilize the wrap down time of the clutch spring 19. In such a device, the backup spring 45 would engage the free end 31 of the clutch spring and cause it to move at the high speed of the primary arbor 13. This would cause the free end of the clutch spring 19 to wrap down at a speed determined by the primary arbor which would be faster than the normal wrap down speed of the clutch spring itself. Since the wrap down time would be primarily dependent upon the rotational velocity of the primary arbor, the wrap down time would tend to be stable and predictable.

While the backup spring 45 is depicted as comprising approximately three quarters of a single spring winding, it can be made to comprise a plurality of windings thereby increasing the amount of force which it may transmit to the free end 31 of the clutch spring 19. Additionally, the end 47 of the backup spring 45 is depicted as acting directly against the free end 31 of the clutch spring 19. It is also possible to modify the clutch mechanism of the present invention without departing from the spirit and scope thereof by causing the end of the backup spring 45 to be anchored within an opening of the clutch sleeve 33 and to thereby act upon the free end 31 of the clutch spring which is also located within an opening 35 of the clutch sleeve 33.

While the invention has been particularly shown and described with reference to to a preferred embodiment thereof, it should be understood by those skilled in the art that the foregoing and other changes in form and detail may be made therein without departing from the scope of the invention.

What is claimed is:

1. A clutch mechanism for coupling a continuously rotating drive to an intermittently operated driven load, said mechanism comprising:
    an input primary arbor connected to the continuously rotating drive;
    an output secondary arbor coaxial with the input arbor;
    a helical clutch spring having coils elastically preloaded radially against said primary and secondary arbors;
    securing means for securing the clutch spring to the secondary arbor;
    a backup spring elastically preloaded radially against the primary arbor for frictional engagement therewith;
    said backup spring being separate from said clutch spring and having a portion for abutting engagement with a portion of the clutch spring located adjacent to the primary arbor for transmitting a wrap down force independent of the elastic preload of the clutch spring from the primary arbor to said portion of the clutch spring only when there is relative motion between the clutch spring and the primary arbor.

2. The clutch mechanism set forth in claim 1 wherein a stop member is selectively operable on the clutch spring to unwrap the clutch spring from the primary arbor and maintain it in its unwrapped position thereby overcoming the elastic preload force of the clutch spring and the wrap down force of the backup spring, the unwrapping of said clutch spring decoupling the rotating drive from the driven load, said backup spring sliding with respect to said primary arbor when the stop member is operable.

3. The clutch mechanism set forth in claim 2 wherein said portion of said clutch spring is the terminal portion of the clutch spring and wherein the stop member is operable on said terminal portion.

4. The clutch mechanism set forth in claim 2 wherein the wrap down force effected by said backup spring effects wrap down of the clutch spring prior to the wrap down effected by the elastic preload of the clutch spring.

5. A clutch mechanism for coupling a continuously rotating drive to a driven load comprising:
- an input primary arbor connected to the continuously rotating drive;
- an output secondary arbor coaxial with the input arbor and connected to the load;
- a helical clutch spring having coils elastically preloaded radially against said primary and secondary arbors, said clutch spring being secured to said secondary arbor;
- a backup means being separate from said clutch spring and frictionally coupled to said primary arbor and having a portion operatively connected to a portion of the clutch spring located adjacent to the primary arbor for transmitting a wrap down force independent of the elastic preload of the clutch spring through said frictional coupling to said portion of the clutch spring only when there is relative motion between the clutch spring and the primary arbor.

6. The clutch mechanism of claim 5, wherein:
the backup means comprises a spring elastically preloaded radially against the primary arbor for frictional engagement therewith.

7. The clutch mechanism set forth in claim 5, wherein:
a stop member is selectively operable on the clutch spring to unwrap the clutch spring from the primary arbor and maintain it in its unwrapped position thereby overcoming the elastic preload force of the clutch spring and the wrap down force of the backup means, the unwrapping of said clutch spring decoupling the rotating drive from the driven load, said backup means sliding with respect to said primary arbor when the stop member is operable.

References Cited
UNITED STATES PATENTS

| | | |
|---|---|---|
| 1,932,000 | 10/1933 | Starkey. |
| 2,518,453 | 8/1950 | Dodwell. |
| 2,951,568 | 9/1960 | Hungerford et al. |
| 1,436,830 | 11/1922 | Sumner _____ 192—81 |
| 2,885,042 | 5/1959 | Frechette. |

BENJAMIN W. WYCHE III, Primary Examiner

U.S. Cl. X.R.

192—41, 81